United States Patent
Gao et al.

(10) Patent No.: US 8,713,151 B2
(45) Date of Patent: Apr. 29, 2014

(54) CONFIGURATION METHOD AND SYSTEM OF COMPLEX NETWORK AND CONFIGURATION AND MANAGEMENT MODULE OF SERVER RESOURCES

(75) Inventors: Bin Gao, Shenzhen (CN); Na Zhang, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 0 days.

(21) Appl. No.: 13/258,057

(22) PCT Filed: Jun. 10, 2010

(86) PCT No.: PCT/CN2010/073758
§ 371 (c)(1),
(2), (4) Date: May 18, 2012

(87) PCT Pub. No.: WO2011/106950
PCT Pub. Date: Sep. 9, 2011

(65) Prior Publication Data
US 2013/0144990 A1   Jun. 6, 2013

(30) Foreign Application Priority Data

Mar. 5, 2010 (CN) .......................... 2010 1 0127574

(51) Int. Cl.
*G06F 15/173* (2006.01)
(52) U.S. Cl.
USPC .......................................... 709/223; 709/226
(58) Field of Classification Search
USPC ................................................ 709/223, 226
See application file for complete search history.

(56) References Cited

U.S. PATENT DOCUMENTS

| 6,189,043 B1* | 2/2001 | Buyukkoc et al. | 709/241 |
| 6,437,804 B1* | 8/2002 | Ibe et al. | 715/736 |
| 7,062,556 B1* | 6/2006 | Chen et al. | 709/226 |
| 7,930,382 B1* | 4/2011 | Tormasov et al. | 709/223 |

FOREIGN PATENT DOCUMENTS

WO   2008091914 A1   7/2008

OTHER PUBLICATIONS

E.A. Leicht and M.E.J. Newman; "Community Structure in Directed Networks"; Physical Review Letters, PRL 100, 118703(2008); week ending Mar. 21, 2008, XP-002699757; see pp. 118703-(1-4).

(Continued)

*Primary Examiner* — Andrew Georgandellis
(74) *Attorney, Agent, or Firm* — Ling Wu; Stephen Yang; Ling and Yang Intellectual Property (57) ABSTRACT

A method and system for configuring a complex network and a server resource configuration and management module are provided. The method comprises: obtaining an access record of each cloud computing server in a cloud server pool in a network; constructing a complex network model according to the access record(s); performing a community division process to the complex network model to obtain a community structure and memberships of members in each community; and configuring a structure of the network according to the community structure and the memberships of the members in each community. The provided technical scheme is applicable to a cloud computing network. The method and system for configuring a complex network and the server resource configuration and management module, realize configuring the network according to the usage of each cloud computing server in the current network, solve the problem of no mechanism for configuring a cloud computing network reasonably.

11 Claims, 4 Drawing Sheets

(56) References Cited

OTHER PUBLICATIONS

Martin Randles et al. "Experiments with Honeybee Foraging Inspired Load Balancing"; School of Computing and Mathematical Sciences, Liverpool John Moores University, Liverpool, UK; {m.j.randles;cmpdlamb;a.talebbendiab} @Ijmu.ac.uk; DOI 10.1109/DeSE.2009.19; see pp. 240-247.

* cited by examiner

CONFIGURATION METHOD AND SYSTEM OF COMPLEX NETWORK AND CONFIGURATION AND MANAGEMENT MODULE OF SERVER RESOURCES

TECHNICAL FIELD

The present invention relates to the communication field, and more particularly, to a method and system for configuring a complex network and a server resource configuration and management module in a cloud computing network.

BACKGROUND OF THE RELATED ART

Cloud computing is an emerging model of business computing. Computing tasks are distributed by the cloud computing in a resource pool composed of a large number of computers, and the resource pool is called "cloud". Through the cloud computing, various application systems can obtain computing capability, storage space and a variety of software services as required.

"Cloud" is some virtual computing resources which can be maintained and managed by its own, and usually is some large-scale server clusters, including computing servers, storage servers, bandwidth resources, and so on. Cloud computing centralizes all the computing resources together, and realizes the automatic management by software without participation of human. It makes the application provider not worry about messy details, and be able to concentrate on their services, thus benefiting innovation and cost reduction.

The basic principle of cloud computing is, by making the computing distribute on a large number of distributed computers, rather than on local computers or remote servers, the running of an enterprise data center is more similar to that on Internet. It makes the enterprise be able to switch the resources to the applications which requires the resources, and access computers and storage systems as required. From the most fundamental sense, the cloud computing is an ability for using the software and data on the Internet.

It can be seen from the principle of the cloud computing that, the implementation of the cloud computing requires the large-scale server clusters to provide terminal users with the needed resources, such as the bandwidth, the storage space and the computing capability. Since the number of users having requirements and the level of the demand on the cloud computing are not evenly divided, they largely relate to the status of scientific research and local economy and. Therefore, allocating and placing the server clusters reasonably have a very important significance for improving the efficiency of cloud computing and allocating reasonably the cloud computing resources; however, there is no mechanism for configuring reasonably a cloud computing network at present.

SUMMARY OF THE INVENTION

The present invention provides a method and a system for configuring a complex network, and a server resource configuration and managemnt module, which solve the problem of no mechanism for configuring a cloud computing network reasonably.

A method for configuring a complex network comprises:
obtaining an access record of each cloud computing server in a cloud server pool in a network;
constructing a complex network model according to the access record(s);
performing a community division process to the complex network model to obtain a community structure and memberships of members in each community; and
configuring a structure of the network according to the community structure and the memberships of the members in each community.

Before the step of obtaining the access record of each cloud computing server in the cloud server pool in the network, the method further comprises:
each cloud computing server in the cloud server pool recording resource requesting situations of terminals in the network to the cloud computing server, and taking the resource requesting situations as the access record.

Before the step of obtaining the access record of each cloud computing server in the cloud server pool in the network, the method further comprises:
setting a network structure configuration cycle, so as to configure the complex network according to the network structure configuration cycle.

The step of obtaining the access record of each cloud computing server in the cloud server pool in the network comprises:
when the network structure configuration cycle expires, reading the access record of that cloud computing server from each cloud computing server in the cloud server pool; and
after the reading is completed, clearing the access record of that cloud computing server.

The step of constructing the complex network model according to the access record(s) comprises:
taking each cloud computing server and each terminal as nodes, and taking the number of the each terminal accessing the each cloud computing server as a weight of an edge connecting the terminal and the cloud computing server;
obtaining model data of the network according to the weight; and
constructing the complex network model according to the model data.

The step of performing the community division process to the complex network model to obtain the community structure and the memberships of members in each community comprises:
according to an expression $$E = \sum_{ij}\left(M_{ij} - \frac{d_i d_j}{n}\right)\Delta_{ij},$$

calculating and obtaining a gain function value E, wherein, $M_{ij}$ is the number of the same neighbor nodes of a node i and a node j, $d_i$ is a degree of the node i, $$\Delta_{ij} = \begin{cases} 1, & i = j \\ 0, & i \neq j, \end{cases}$$

and $$\frac{d_i d_j}{n}$$

is the number of the same neighbors possessed between a structure pair when the network connects randomly;

according to an expression $$C = (c_{ij}) = \left(\sum_{k=1}^{n} A_{ki}A_{kj} - \frac{d_i d_j}{n}\right),$$

calculating and obtaining a gain matrix C;

according to an eigenvector to which a max-eigen of the gain matrix C corresponds, dividing the network into two communities;

according to an expression $$C^{(g)} = (c_{ij}^{(g)}) = \left(c_{ij} - \Delta_{ij}\sum_{k \in g} c_{ik}\right),$$

calculating and obtaining an incremental matrix $C^{(g)}$ of each community; wherein, g is a community number;

performing a further division respectively according to an eigenvector to which a maximum eigenvalue of the incremental matrix of each community corresponds, and calculating an increment $\Delta E$ of the gain function value E of each community obtained after dividing; and if $\Delta E \leq 0$, taking the community structure of the current community and the memberships of the members in the community as a final result; or, if $\Delta E > 0$, performing a further division to the community, until the increment of the community obtained after dividing is $\Delta E \leq 0$.

The step of configuring the structure of the network according to the community structure and the memberships of the members in each community comprises:

adjusting a position of the cloud computing server according to the community structure; and adjusting the number of the cloud computing servers according to the memberships of the members in each community.

The step of adjusting the position of the cloud computing server according to the community structure comprises:

according to the number of each terminal in the community accessing the cloud computing server, calculating a position of a minimum average distance between the cloud computing server and each terminal; and locating the cloud computing server at the position of the minimum average distance.

Before the step of obtaining the access record of each cloud computing server in the cloud server pool in the network, the method further comprises:

setting a membership criterion, which is used to provide a basis of adjusting the number of the cloud computing servers.

The step of adjusting the number of the cloud computing servers according to the memberships of the members in each community comprises:

judging whether a membership of a member of each cloud computing server meets the membership criterion; and if the membership of the cloud computing server meets the membership criterion, adding a load-sharing server for the cloud computing server; or, if the membership of the cloud computing server does not meet the membership criterion, deleting the cloud computing server.

The present invention also provides a system for configuring a complex network, and the system comprises a cloud server pool, an access record database management and maintenance module, and a server resource configuration and management module; wherein, the access record database management and maintenance module is configured to obtain an access record of each cloud computing server in a cloud server pool in a network;

the server resource configuration and management module is configured to: construct a complex network model according to the access record(s), to perform a community division process to the complex network model so as to obtain a community structure and memberships of members in each community, and to configure a structure of the network according to the community structure and the memberships of members in each community.

The cloud server pool comprises a cloud computing server, and the cloud computing server is configured to record resource requesting situations of terminals in the network requesting to the cloud computing server, and to take the resource requesting situations as the access record.

The present invention also provides a server resource configuration and management module, configured to: construct a complex network model according to an obtained access record of each cloud computing server in a cloud server pool, to perform a community division process to the complex network model so as to obtain a community structure and memberships of members in each community, and to configure a structure of the network according to the community structure and the memberships of members in each community.

The embodiments of the present invention provide a method and a system for configuring a complex network and a server resource configuration and management module, which obtain the access record of each cloud computing server in the cloud server pool of the network, construct the complex model according to the access record(s), and then perform the community division process to the complex network model so as to obtain the community structure and the memberships of members in each community, and at last, configure the structure of the network according to the community structure and the memberships of members in each community, thus realizing the network configuration according to the usage of each cloud computing server in the current network, solving the problem of no mechanism for configuring a cloud computing network reasonably, and improving the bandwidth, storage space and computing capability provided by the cloud computing server.

PREFERRED EMBODIMENTS OF THE PRESENT INVENTION

A complex network is an abstraction of a complex system, a node in the network is an individual in the complex system, and an edge between the nodes is a relationship between the individuals naturally formed or artificially constructed in accordance with a certain rule. A friendship network, a World Wide Web network, a power network, and a metabolic network, etc., can be seen as the complex network. A small world character is referred to that, compared with the same scale random network, that network has a smaller average minimun distance and a bigger clustering coefficient. A scale-free character means that a degree distribution of the nodes in the network follows a power-law distribution, that is, the degree distribution is a declining straight line in a double logarithmic coordinate.

Figure 1:
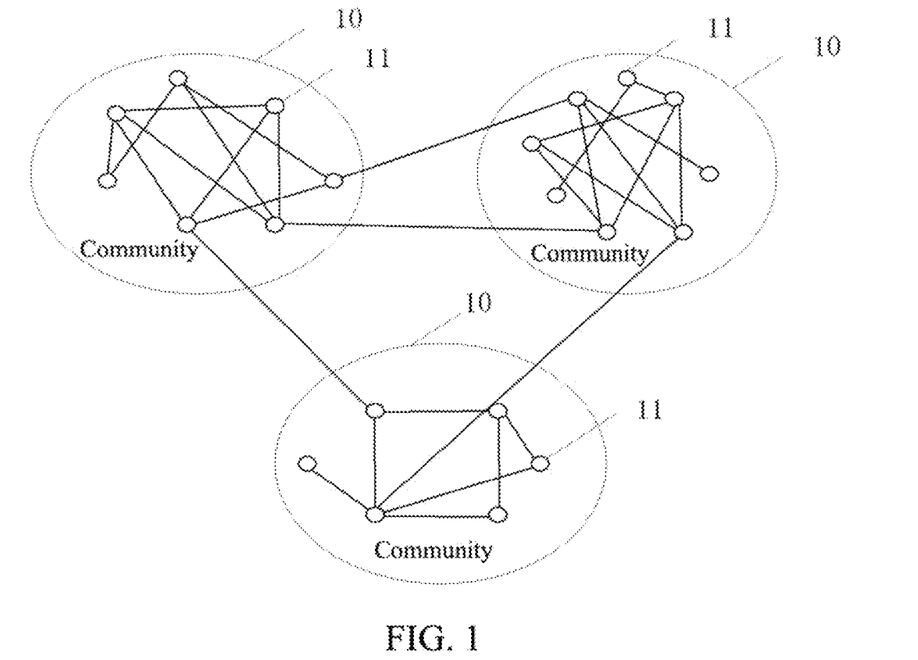
FIG. 1 is a structural diagram of a complex network including a plurality of communities.

A community structure is an important characteristic presented by the complex network. The entire network is composed of several "groups" or "clusters", and the connections between the internal nodes of each group are very close relatively; however, the connections among groups are relatively sparse. A structure of a complex network including a plurality of communities 10 is shown in FIG. 1, and a community 10 contains a plurality of nodes 11.

In the research of a community structure division of a complex network, the network to be divided by a community structure division algorithm can be roughly divided into two types, the first type is a relatively common network, i.e., the network only including a positive connection (the weight values of edges in the network is positive real numbers); and the second type is a symbol social network, i.e., the network including both edges of the positive connections and edges of the negative connections. Therefore, the algorithm dividing the community structure in the network correspondingly classifies two types, while a plurality of different community structure division algorithms are proposed for the first type of network. The traditional algorithm for dividing the first type of the network community can be divided into two categories, the first type is an algorithm based on a graph theory, such as a K-L algorithm, a spectral bisection method, a random walk algorithm and a clique percolation algorithm, and so on; and the second type is a hierarchical clustering algorithm, such as an agglomerative algorithm based on a similarity measurement and a divisive algorithm based on a boundary number measurement, and so on. In recent years, a plurality of algorithms for dividing the first type of the network community structure are also proposed from other different angles, and the algorithms can be roughly divided as follows: an algorithm based on resistance network properties, an algorithm based on an information theory, an algorithm based on a principal component analysis (PCA) and an algorithm of a maximum modularity, and so on. For the symbol network, there is an algorithm for dividing the community structure of the symbol network by using a local search in the related art, as well as a heuristic algorithm for dividing the community structure of the symbol network based on an agent (FEC). The following focuses on the algorithm for dividing the community structure based on a modularity matrix.

The purpose of that algorithm is to let the community inside have edges as many as possible, and this purpose can be realized by maximizing a difference between the number of edges within the community in the actual network and the number of edges within the community in the case of randomly connecting the networks. However, finding the maximum value of the difference should consume a large amount of computation, which is not suitable for the community division of the large-scale and complex network; therefore, a method can be found to make the difference as large as possible. The community division method based on the modularity matrix is a method to make the difference as large as possible by using the spectrum feature of the modularity matrix. After removing the constant coefficient item of the right side of the equation, the expression 1 indicates the above difference in the case of the network being divided into two communities:

$$Q = \frac{1}{4m}\sum_{ij}\left(A_{ij} - \frac{k_ik_j}{2m}\right)(s_is_j + 1) = \frac{1}{4m}\sum_{ij}\left(A_{ij} - \frac{k_ik_j}{2m}\right)s_is_j \quad \text{Expression 1}$$

wherein, m is a total of the edges in the network, $k_i$ is the degree of the node i in the network, $A_{ij}$ is an element in an adjacency matrix of the network, and $$\frac{k_ik_j}{2m}$$

is the number of the edges possessed between the node i and the node j in the network which is in the case of connecting randomly. $S=(s_1,s_2,\ldots,s_n)^T$ is a signature vector, if the node i belongs to the first community, $s_i=1$, otherwise, $s_i=-1$. The value of Q in the aforementioned expression is a value of modularity after the network is divided into two communities. The expression 1 can be converted to the following equivalent form:

$$Q = \frac{1}{4m}s^TBs \quad \text{Expression 2}$$

wherein, the matrix B is called as a modularity matrix, $$B_{ij} = A_{ij} - \frac{k_ik_j}{2m}.$$

The algorithm for dividing the network into two communities based on the modularity matrix is described as follows: at first, the eigenvector to which the maximum eigenvalue of the modularity matrix B corresponds is obtained, and then the network is divided into two communities according to the positive elements and the negative elements of the eigenvector. The positive elements belong to one community, and the negative elements belong to the other community. The time complexity of that algorithm is $O(n^2 \log n)$, wherein, n is the number of the nodes in the network.

During the construction of the complex network model, cloud computing servers and terminal users can be seen as the nodes in the network; and if a terminal user has a request to a certain cloud computing server, there is an edge connecting between the terminal user and the cloud computing server, and the edge weight represents the number of the terminal user accessing the cloud computing server. It mainly concentrates on the resource request relation between the cloud computing servers and the terminal users in the construction of the network model, and the terminal user tends to request a server which is closer with the terminal user, so the cloud computing server is in the core position in the entire network, and it needs to interact with numerous terminal users. Therefore, that network model conforms with the characteristic of the complex network, and it can be analyzed by means of the complex network community division technology.

The embodiment of the present invention provide a method for configuring a complex network by combining the above method of performing the community division to the complex network with the cloud computing network, which solves the problem of no mechanism for configuring the cloud computing network reasonably, and realizes that the network configuration is performed according to the usage of each cloud computing server in the current network.

Figure 2:
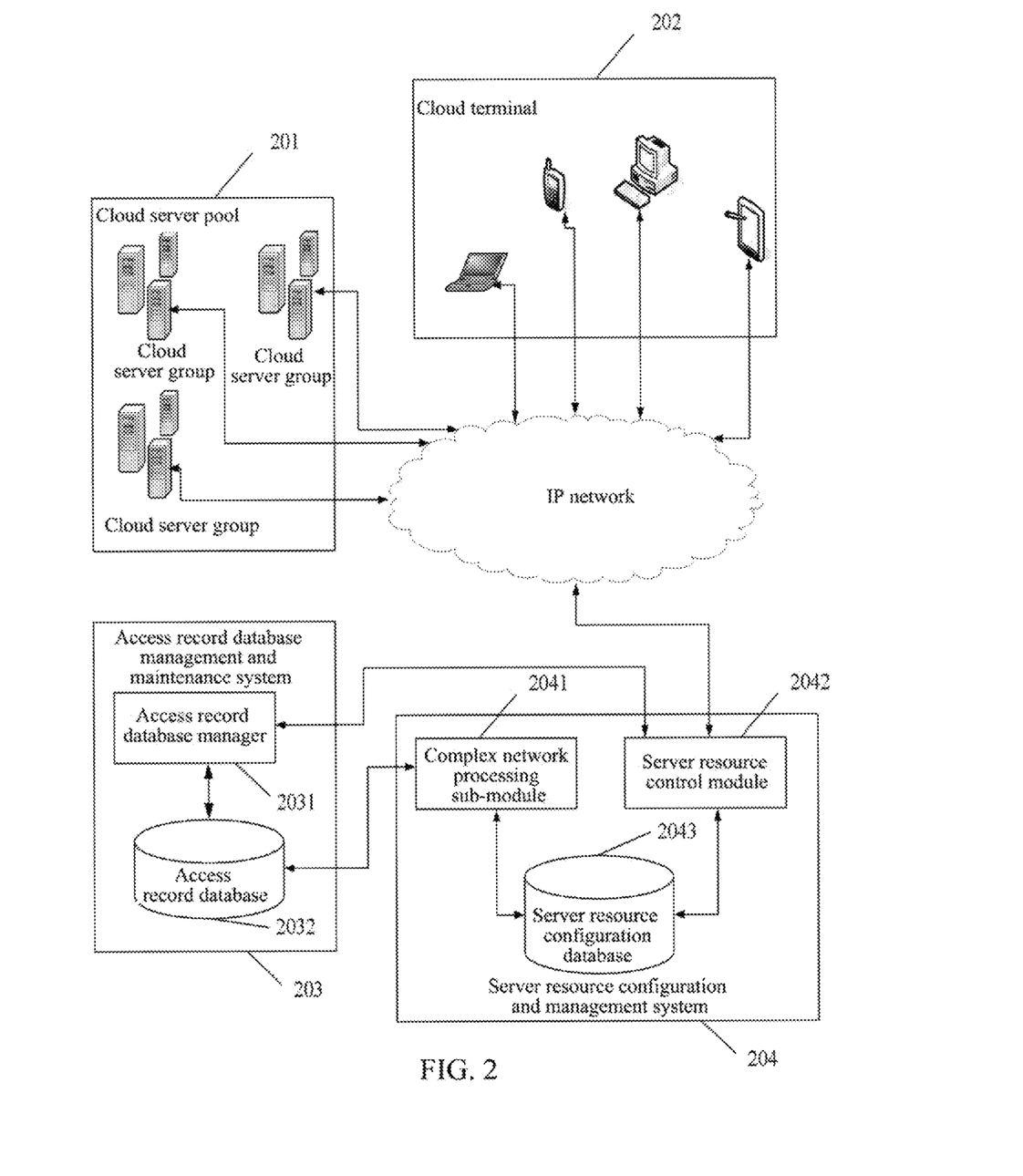
FIG. 2 is a structural diagram of an application scenario in accordance with an embodiment of the present invention.

In order to make the embodiment of the present invention be understood more easily, first of all, an application environment of the embodiment of the present invention is introduced, and the network environment used by the embodiment of the present invention is shown in FIG. 2, which comprises a cloud server pool 201, cloud terminals 202, an access record database management and maintenance system 203 and a server resource configuration and management system 204. Wherein, the cloud server pool 201 comprises at least one set of cloud server group, and each set of cloud server group corresponds to one kind of service; the cloud terminals 202 comprise a plurality of terminals for the user accessing the network, such as a mobile phone, a personal computer (PC), and so on; the access record database management and maintenance system 203 comprises an access record data manager 2031 and an access record database 2032; the server resource configuration and management system 204 comprises a complex network processing sub-module 2041, a server resource controller 2042 and a server resource configuration database 2043. The cloud server pool 201, the cloud terminals 202, the access record database management and maintenance system 203 and the server resource configuration and management system 204 communicate with each other via the internet protocol (IP). The access record data manager 2031 is used to store the record data of accessing the cloud servers and maintain the database.

Figure 3:
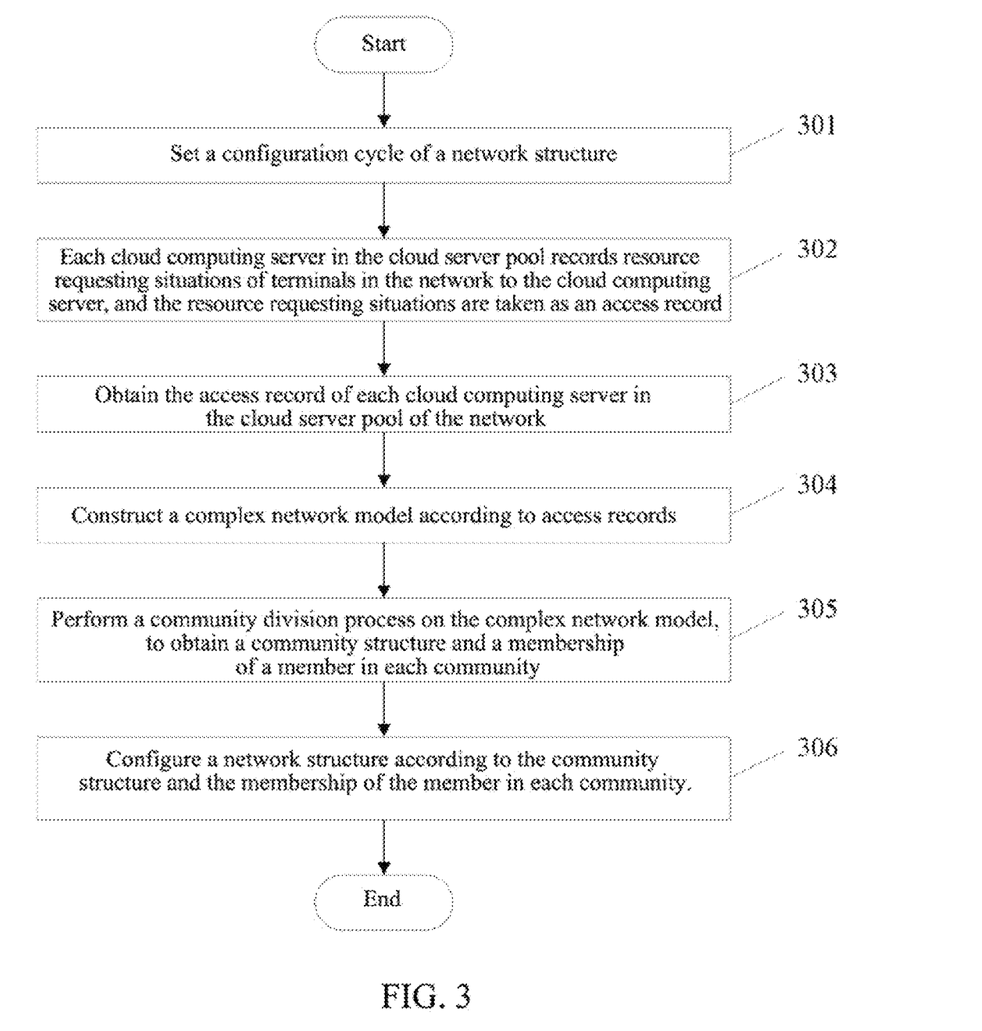
FIG. 3 is a flow chart of a method for configuring a complex network structure provided by an embodiment of the present invention.

The method for configuring the complex network provided by the embodiment of the present invention will be illustrated in combination with the aforementioned application environment hereinafter. A process of completing the network configuration by using the method is as shown in FIG. 3, and the process comprises the following steps.

In step 301, a configuration cycle of the network structure is set;

in this step, the configuration cycle of the network structure is set, and the cycle is stored into the server resource controller.

Since the terminal users accessing the server cluster varies over time, the overall architecture of the server cluster cannot be changeless, and the system needs to be adjusted periodically, in order to conform with the changes of new resource requirements.

In addition, when the cloud computing network is constructed newly, the cloud computing network is also needed to be configured by the method for configuring the complex network provided by the embodiment of the present invention.

In step 302, each cloud computing server in the cloud server pool records the resource requesting situations of the terminals in the network requesting to the current cloud computing server, and the resource requesting situations are taken as the access record.

In the embodiment of the present invention, a list of the terminal users accessing the server is maintained on each cloud computing server, and each item of the content in the list is the IP of the terminal user and the number of times for accessing the cloud computing server, which is used to obtain the situations of the terminal users requesting the server resources in a period of time; and the list is the access record.

In step 303, the access record of each cloud computing server in the cloud server pool of the network are obtained;

in the step, when one configuration cycle of the network structure expires, a complex network processing sub-module derives the access record in that configuration cycle of the network structure from each cloud computing server, and introduces all the data of the accessed cloud computing servers into the access record database.

In step 304, the complex network model is constructed according to access records.

Figure 4:
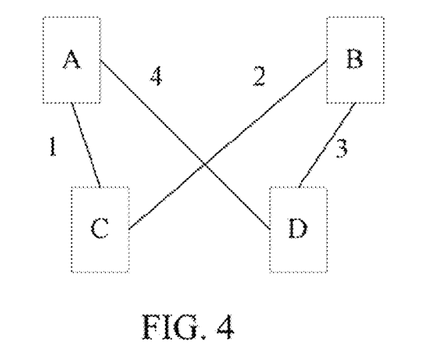
FIG. 4 is a structural diagram of a complex network.

In the embodiment of the present invention, the cloud computing servers and the terminal users are taken as the nodes of the network, and the number of the terminal user accessing the server is taken as the weight of an edge connecting that terminal user and that server, and the model data of the complex network is obtained by taking advantage of the access record database manager. For example, as shown in FIG. 4, A, B, C and D respectively represent two different cloud servers and two different user terminals in the cloud computing, assuming that the resource requesting network among them is shown as follows, wherein, the weight of the edge represents the number of times of the terminal requesting to the cloud server, the weight between A and C is 1, the weight between B and C is 2, the weight between B and D is 3, and the weight between A and D is 4, then the corresponding model data of the complex network is a matrix, shown as follows:

$$\begin{array}{c} \phantom{A} \; A \; B \; C \; D \\ \begin{array}{c} A \\ B \\ C \\ D \end{array} \left[ \begin{array}{cccc} 0 & 0 & 1 & 4 \\ 0 & 0 & 2 & 3 \\ 1 & 2 & 0 & 0 \\ 4 & 3 & 0 & 0 \end{array} \right] \end{array}$$

The complex network processing sub-module constructs the complex network model of the cloud computing network according to the model data, so as to perform the community division.

Those skilled in the field are obviously aware that, the method for obtaining the model data is not limited to the above one, but the methods are not illustrated one by one in the embodiment of the present invention.

Figure 5:
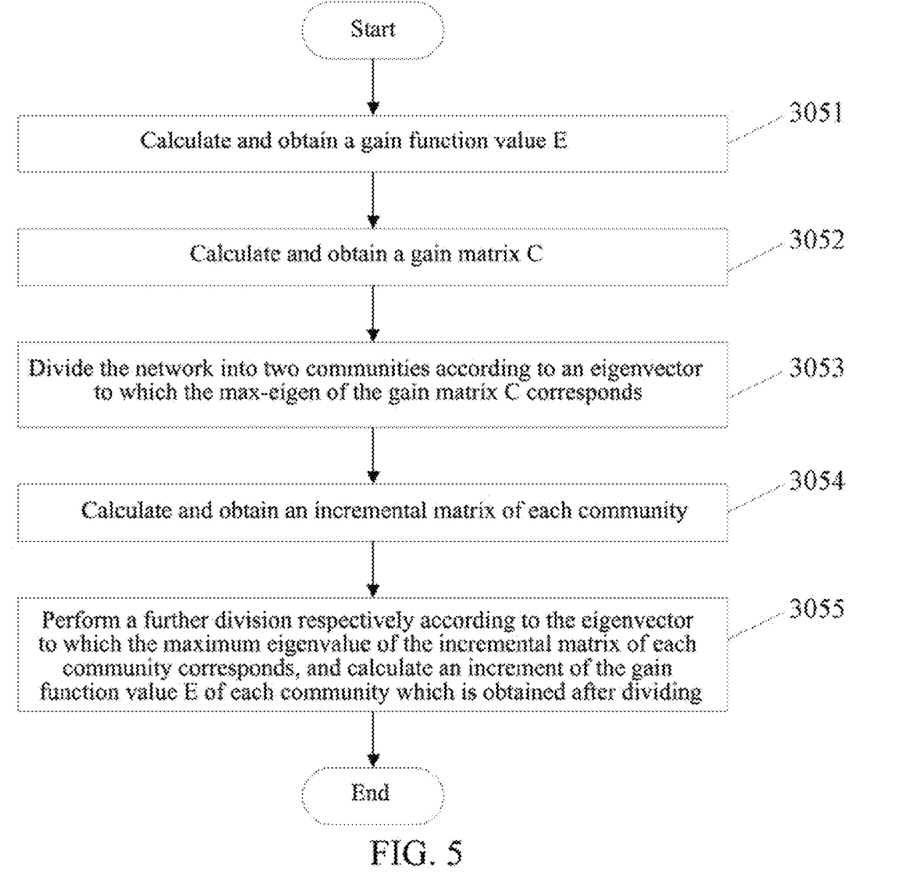
FIG. 5 is a specific flow chart of step 305 as shown in FIG. 3.

In step 305, the community division process is performed to the complex network model, so as to obtain the community structure and memberships of members in each community;

in the step, the complex network processing sub-module takes advantage of the complex network community division technology, and analyzes and processes the data of the complex network model; and the specific flow is shown in FIG. 5, which comprises the following steps.

In step 3051, a gain function value E is calculated and obtained according to an expression 3;

$$E = \sum_{ij} \left( M_{ij} - \frac{d_i d_j}{n} \right) \Delta_{ij} \qquad \text{Expression 3}$$

wherein, $M_{ij}$ is the number of the same neighbor nodes of the node i and the node j, $d_i$ is the degree of node i, $$\Delta_{ij} = \begin{cases} 1, & i = j \\ 0, & i \neq j, \end{cases}$$

and $$\frac{d_i d_j}{n}$$

is the number of the same neighbors possessed between the structure pair when the networks connect randomly.

In step 3052, a gain matrix C is calculated and obtained according to an expression 4;

$$C = (c_{ij}) = \left( \sum_{k=1}^{n} A_{ki} A_{kj} - \frac{d_i d_j}{n} \right) \quad \text{Expression 4}$$

In step 3053, the network is divided into two communities according to the eigenvector to which the max-eigen of the gain matrix C corresponds.

Since the eigenvector can be positive or negative, in the embodiment of the present invention, one network is always divided into two communities when the community division is performed. It should be noted that the division according to the eigenvector is only one of the division methods when the community division process is performed to the complex network. Those skilled in the art are obviously aware that the division method is not limited to the above one, and according to the different division methods, the number of the dividable communities varies correspondingly when the division is performed; and the methods are not illustrated one by one in the embodiment of the present invention.

In step 3054, an incremental matrix $C^{(g)}$ of each community is calculated and obtained according to an expression 5;

$$C^{(g)} = (c_{ij}^{(g)}) = \left( c_{ij} - \Delta_{ij} \sum_{k \in g} c_{ik} \right) \quad \text{Expression 5}$$

wherein, g is a community number.

In step 3055, a further division is performed respectively according to an eigenvector to which the maximum eigenvalue of the incremental matrix of each community corresponds, and an increment ΔE of the gain function value E of each community which is obtained after dividing is calculated.

In step 3056, it is judged whether a further division is needed to be performed to the community;

that step specifically is judging whether the increment ΔE of the gain function value E of each community is less than or equal to 0.

if ΔE≤0, the community structure of the current community and the memberships of the members of the community are taken as a final result; if ΔE>0, the further division is performed on the community, until the obtained increment of the community after dividing is ΔE≤0.

In step 306, the structure of the network is configured according to the community structure and the memberships of the members in each community.

In the step, each community structure and memberships of the members in each community obtained after the community division are introduced into the server resource configuration database, and the server resource controller obtains the community structure and the memberships of the members in each community from the server resource configuration database, to configure the cloud servers dynamically. The specific configuration process includes two aspects, which are illustrated specifically hereinafter.

On the one hand, the number of cloud computing servers providing the same service is needed to be adjusted. Most of the algorithms for dividing the complex network community structure stipulates that the range of the membership of the member within the community to the community is from 0 to 1, and the larger the value of the membership is, the more important the status of the member is in the community. In the embodiment of the present invention, when the system is initialized, a membership criterion is set on the server resource controller, and the membership criterion is specifically a membership threshold, which can be obtained by averaging the community membership of the servers in all the communities; the cloud computing server, the membership of which is larger than or equal to the threshold, has a heavier task, and is needed to additionally add a load-sharing server to share the workload of that cloud computing server. If the membership of a certain cloud computing server is less than the aforementioned threshold, the cloud computing server is considered to be removed from the server cluster.

Preferably, the membership criterion can also be two memberships thresholds, which are the first threshold and the second threshold respectively, and the first threshold is larger than the second threshold. When the membership of a cloud computing server is larger than or equal to the first threshold, that cloud computing server is considered to have a heavier task; when the membership of a cloud computing server is less than or equal to the second threshold, that cloud computing server is considered to be more idle, and to be able to removed.

On the other hand, within every community, a position of the minimum average distance between the cloud computing server and each terminal user in the community can be calculated by the number of the terminal user accessing each server. Specifically, a two-dimensional coordinate can be defined within the community, and each terminal corresponds to a coordinate value; assuming that there are two terminal users, namely x and y, within the community, the coordinates of which are (x1, y1) and (x2, y2) respectively, and the corresponding numbers of accessing the cloud server in the community are 2 and 3 respectively, then, the average value of x coordinates of all the terminal users in the community can be obtained by (x1*2+x2*3)/(2+3), and the average value of y coordinates can be obtained correspondingly; the average values of that coordinate can be taken as a placement position of the cloud server, and the position of the server is adjusted according to the above calculation result. Those skilled in the art are obviously aware that there are other methods for calculating the position of the minimum average distance, which are not illustrated one by one here.

With performing the division to the network model by using the complex network community division technology, the following result can be obtained, n communities and the membership of each server in the community to the community. Within every community, the placement position of the cloud computing server can be adjusted according to the number of each terminal user in the community accessing to the cloud computing server in the community, so that the relative average distance from the cloud computing server to each terminal user is minimum; since the average distance takes the number of the terminal users accessing the cloud computing server into account, it is not necessarily the average distance of the geographic location. And if the membership of the server in the community is higher, it indicates that the terminal users in the community have larger demand for resources, therefore the number of servers can be increased appropriately to reduce the load on the server within the community.

The embodiment of the present invention also provides a system for configuring a complex network, and the system comprises a cloud server pool, an access record database management and maintenance module and a server resource configuration and management module;

the access record database management and maintenance module is configured to obtain the access record of each cloud computing server in the cloud server pool of the network;

the server resource configuration and management module is configured to: construct a complex network model according to the access records, and to perform a community division process to the complex network model so as to obtain a community structure and memberships of members in each community, and to configure a structure of the network according to the community structure and the memberships of members in each community.

Furthermore, the cloud server pool comprises at least one cloud computing server, and the cloud computing server is configured to record the resource requesting situations of terminals in the network to the cloud computing server, and to take the resource requesting situations as the access record.

The above system for configuring the complex network can be combined with the method for configuring the complex network provided by the embodiment of the present invention, obtains the access record of each cloud computing server in the cloud server pool of the network, constructs the complex network model according to the access record(s), and then performs the community division process to the complex network model to obtain the community structure and the memberships of members in each community, and at last configures the structure of the network according to the community structure and the memberships of members in each community, thus realizing the network configuration according to the usage of each cloud computing server in the current network. By adding and reducing the number of server clusters dynamically and adjusting the positions of the server clusters reasonably, the cloud computing server resources can be used reasonably, and the purpose of reducing the transmission time of the user data and improving the transmission quality of the user data can be achieved by shortening the transmission distance of the user data, thus being helpful to improve the timeliness and reliability of the cloud computing system.

The present invention also provides a server resource configuration and management module, and the server resource configuration and management module is configured to: construct a complex network model according to the obtained access record of each cloud computing server in the cloud server pool, and to perform a community division process to the complex network model so as to obtain a community structure and the memberships of members in each community, and to configure the structure of the network according to the community structure and the memberships of members in each community.

The aforementioned server resource configuration and management module can be combined with the method for configuring the complex network provided by the embodiment of the present invention, constructs the complex network model according to the obtained access records, and then performs the community division process to the complex network model to obtain the community structure and the memberships of members in each community, and at last configures the structure of the network according to the community structure and the memberships of members in each community, thus realizing the network configuration according to the usage of each cloud computing server in the current network, and improving the bandwidth, storage space and computing capability provided by the cloud computing servers. Those skilled in the art can understand that, all of or part of steps carried for implementing the aforementioned embodiment method can be achieved by programs instructing relevant hardware, and the programs can be stored in a computer readable storage medium; when the programs are executed, one or a combination of the steps of the method embodiment are included.

In addition, each functional unit in each embodiment of the present invention can be implemented in the form of hardware, as well as be implemented in the form of software function module. If the integrated module is implemented in the form of the software function module and is taken as a standalone product to be sold or used, it can also be stored in a computer readable storage medium.

The aforementioned storage medium might be a read-only memory, a magnetic disk or an optical disk, and so on.

The above description is only the specific embodiments of the present invention, but the protection scope of the present invention is not limit to the above description. Those skilled in the art can easily think of variations and equivalents within the technology scope disclosed by the present invention, and the variations and equivalents should be contained within the protection scope of the present invention. Therefore, the protection scope of the present invention should be based on the protection scope described by the claims.

Industrial Applicability

The method and system for configuring a complex network and the server resource configuration and management module provided by the present invention, realize the network configuration according to the usage of each cloud computing server in the current network, are able to make the cloud computing server resources be used reasonably by adding and reducing the number of server clusters dynamically and adjusting the positions of the server clusters reasonably, and can achieve the purpose of reducing the transmission time of the user data and improving the transmission quality of the user data by shortening the transmission distance of user data, improve the timeliness and reliability of the cloud computing system.

What we claim is:

1. A method for configuring a complex network, comprising:
    obtaining an access record of each cloud computing server in a cloud server pool in a cloud computing network;
    constructing a complex network model according to all of the access record(s);
    performing a community division process to the complex network model to obtain a community structure and memberships of members in each community; and
    configuring a structure of the cloud computing network according to the community structure and the memberships of the members in each community;
    wherein the step of configuring the structure of the cloud computing network according to the community structure and the memberships of the members in each community comprises:
        adjusting a position of a cloud computing server in a community according to the community structure; and
        adjusting the number of the cloud computing servers in the cloud server pool according to the memberships of the cloud computing servers in the communities;

wherein the step of adjusting a position of a cloud computing server in a community according to the community structure comprises:

according to the number of times each terminal in the community accessing the cloud computing server, calculating a position of a minimum average distance between the cloud computing server and the each terminal; and locating the cloud computing server at the position of the minimum average distance.

2. The method according to claim 1, wherein, before the step of obtaining the access record of each cloud computing server in the cloud server pool in the cloud computing network, the method further comprises:

each cloud computing server in the cloud server pool recording resource requesting situations of all terminals in the cloud computing network to the cloud computing server, and taking the resource requesting situations as the access record.

3. The method according to claim 1, wherein, before the step of obtaining the access record of each cloud computing server in the cloud server pool in the cloud computing network, the method further comprises:

setting a network structure configuration cycle, so as to configure the cloud computing network according to the network structure configuration cycle.

4. The method according to claim 3, wherein, the step of obtaining the access record of each cloud computing server in the cloud server pool in the cloud computing network comprises:

when the network structure configuration cycle expires, reading the access record of each cloud computing server in the cloud server pool; and after the reading is completed, clearing the access record of the each cloud computing server.

5. The method according to claim 1, wherein, the step of constructing the complex network model according to the access record(s) comprises:

taking each cloud computing server and each terminal as nodes, and taking the number of times the each terminal accessing the each cloud computing server as a weight of an edge connecting the terminal and the cloud computing server;

obtaining model data of the cloud computing network according to the weight; and constructing the complex network model according to the model data.

6. The method according to claim 1, wherein, the step of performing the community division process to the complex network model to obtain the community structure and the memberships of members in each community comprises:

according to an expression $$E = \sum_{ij} \left( M_{ij} - \frac{d_i d_j}{n} \right) \Delta_{ij},$$

calculating and obtaining a gain function value E, wherein, $M_{ij}$ is the number of the same neighbor nodes of a node i and a node j, $d_i$ is a degree of the node i, $$\Delta_{ij} = \begin{cases} 1, & i = j \\ 0, & i \neq j, \end{cases}$$

and $$\frac{d_i d_j}{n}$$

is the number of the same neighbors possessed between a structure pair when the network connects randomly;

according to an expression $$C = (c_{ij}) = \left( \sum_{k=1}^{n} A_{ki} A_{kj} - \frac{d_i d_j}{n} \right),$$

calculating and obtaining a gain matrix C;

according to an eigenvector to which a max-eigen of the gain matrix C corresponds, dividing the network into two communities;

according to an expression $$C^{(g)} = \left( c_{ij}^{(g)} \right) = \left( c_{ij} - \Delta_{ij} \sum_{k \in g} c_{ik} \right),$$

calculating and obtaining an incremental matrix $C^{(g)}$ of each community; wherein, g is a community number;

performing a further division respectively according to an eigenvector to which a maximum eigenvalue of the incremental matrix of each community corresponds, and calculating an increment ΔE of the gain function value E of each community obtained after dividing; and if ΔE≤0, taking the community structure of the current community and the memberships of the members in the community as a final result; or, if ΔE>0, performing a further division to the community, until the increment of the community obtained after dividing is ΔE≤0.

7. The method according to claim 1, wherein, before the step of obtaining the access record of each cloud computing server in the cloud server pool in the cloud computing network, the method further comprises:

setting a membership criterion, which is used to provide a basis of adjusting the number of the cloud computing servers in the cloud server pool.

8. The method according to claim 7, wherein, the step of adjusting the number of the cloud computing servers in the cloud server pool according to the memberships of the cloud computing servers in the communities comprises:

judging whether the membership of each cloud computing server meets the membership criterion; and if the membership of the cloud computing server meets the membership criterion, adding a load-sharing server for the cloud computing server; or, if the membership of the cloud computing server does not meet the membership criterion, deleting the cloud computing server.

9. A system executing on one or more processors for configuring a complex network, the system comprising a cloud server pool, an access record database management and maintenance module, and a server resource configuration and management module; wherein, the access record database management and maintenance module is configured to obtain an access record of each cloud computing server in a cloud server pool in a cloud computing network;

the server resource configuration and management module is configured to: construct a complex network model according to all of the access record(s), to perform a community division process to the complex network model so as to obtain a community structure and memberships of members in each community, and to configure a structure of the cloud computing network according to the community structure and the memberships of members in each community;

wherein configuring the structure of the cloud computing network according to the community structure and the memberships of the members in each community comprises:

adjusting a position of a cloud computing server in a community according to the community structure; and adjusting the number of the cloud computing servers in the cloud server pool according to the memberships of the cloud computing servers in the communities;

wherein adjusting a position of a cloud computing server in a community according to the community structure comprises:

according to the number of times each terminal in the community accessing the cloud computing server, calculating a position of a minimum average distance between the cloud computing server and the each terminal; and locating the cloud computing server at the position of the minimum average distance.

10. The system according to claim 9, wherein, the cloud server pool comprises cloud computing servers, and each of the cloud computing server is configured to record resource requesting situations of all terminals in the cloud computing network requesting to the cloud computing server, and to take the resource requesting situations as the access record.

11. A server resource configuration and management module stored on a non-transitory computer readable storage medium, configured to: construct a complex network model according to an obtained access record of each cloud computing server in a cloud server pool in a cloud computing network, to perform a community division process to the complex network model so as to obtain a community structure and memberships of members in each community, and to configure a structure of the cloud computing network according to the community structure and the memberships of members in each community;

wherein configuring the structure of the cloud computing network according to the community structure and the memberships of the members in each community comprises:

adjusting a position of a cloud computing server in a community according to the community structure; and adjusting the number of the cloud computing servers in the cloud server pool according to the memberships of the cloud computing servers in the communities;

wherein adjusting a position of a cloud computing server in a community according to the community structure comprises:

according to the number of times each terminal in the community accessing the cloud computing server, calculating a position of a minimum average distance between the cloud computing server and the each terminal; and locating the cloud computing server at the position of the minimum average distance.

\* \* \* \* \*